United States Patent [19]
Dibos

[11] Patent Number: 4,736,413
[45] Date of Patent: Apr. 5, 1988

[54] METHOD FOR THE CONTROL OF VOICE CHANNEL ATTENUATION

[75] Inventor: Hermann Dibos, Munich, Fed. Rep. of Germany

[73] Assignee: Siemens Aktiengesellschaft, Berlin and Munich, Fed. Rep. of Germany

[21] Appl. No.: 19,347

[22] Filed: Feb. 26, 1987

[30] Foreign Application Priority Data

Mar. 20, 1986 [DE] Fed. Rep. of Germany ....... 3609494

[51] Int. Cl.$^4$ ........................ H04M 9/08; H04M 1/60
[52] U.S. Cl. .................................................. 379/390
[58] Field of Search ........................ 379/390, 387, 388

[56] References Cited

U.S. PATENT DOCUMENTS 4,571,461 2/1986 Uno et al. ........................... 379/370

Primary Examiner—Stafford D. Schreyer
Attorney, Agent, or Firm—Hill, Van Santen, Steadman & Simpson

[57] ABSTRACT

A method for the control of voice channel attenuation for the purpose of balancing the level attenuation tolerances of individual functional units in telephone terminal equipment. A non-erasable memory location is provided and contains control data which is utilized by a microprocessor to set an adjustable attenuation element contained in the voice channel. Furthermore, the input level of the voice channel is increased by half the sum of all level attenuation tolerances of the functional units contained within the voice channel. This insures an output level of the voice channel which will be within prescribed limits.

12 Claims, 1 Drawing Sheet

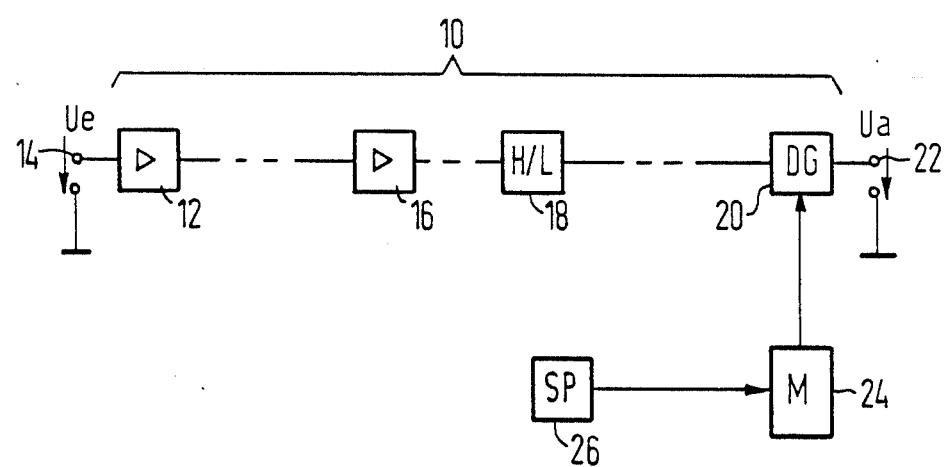

METHOD FOR THE CONTROL OF VOICE CHANNEL ATTENUATION

BACKGROUND OF THE INVENTION

1. Field of the Invention

The present invention relates in general to the field of balancing different attenuation levels in a voice channel of telephone terminal equipment, and more specifically, controlling the voice channel attentuation depending upon the direction of transmission in the telephone terminal equipment, especially for speaker phone type equipment.

2. Description of the Prior Art

In basic telephone terminal equipment, a voice channel may be composed of a series of function units which are considered one sided and may compose the transmission line, a receiver, a telephone and a transmitter. In modern day high quality telephone terminal equipment, such as a speaker phone system, additional functional units may be included, such as amplifiers, microphones, loudspeakers and attenuation elements. The attenuation element is typically controlled by a microprocessor which determines if a transmission or reception channel is currently in operation. German Patent No. 2,714,132 discloses such a circuit arrangement.

During transmission or reception of the telephone terminal equipment, certain functional units will be combined to form a voice channel. Each of the functional units has a defined attenuation level that varies in a known range of tolerance. The sum of all possible deviations of these levels of attenuation for the individual functional units may be highly noticeable in the voice channel. That is, the prescribed range of tolerance for the output level of the voice channel can be downwardly or upwardly transgressed due to the combined effect of the attenuation levels of the functional units. In order to prevent this, the attenuation levels of the individual functional units must be measured during manufacture of the telephone terminal equipment and must be added so that a corresponding, additional attenuation element can be added to the voice channel. This ensures that the output level of the voice channel is within its prescribed tolerance.

During manufacture of the telephone equipment, the above procedure must be performed for each unit and the result is unique to each of these units for every voice channel within the unit.

SUMMARY OF THE INVENTION

The present invention is a method for controlling voice channel attenuation in telephone terminal equipment. Control of the voice channel attenuation is achieved by increasing an input level to the voice channel by a predetermined value and also by providing control data which is used to set an attenuation element to a proper value so that the output level of the voice channel is within its prescribed tolerance. It is a feature of the present invention that the novel method provides a simpler and less costly solution to the prior art problem of compensating for the range of tolerances of each of the individual functional units in the telephone terminal equipment.

In the novel method of the present invention, the levels of attenuation tolerances of all functional units within the voice channel are computationally added. The input level of the voice channel is then increased by half the sum of the calculated attenuation tolerances. This produces a predetermined minimum output level of the voice channel. In addition to the increase in the input level of the voice channel, control data associated with the voice channel is stored in a predetermined location in a non-erasable electronic memory contained within the telephone terminal equipment. During operation of the voice channel, this control data is interrogated by a microprocessor which then initiates the attenuation element so that proper balancing of the levels of attenuation of the individual functional units produce a predetermined output level for the voice channel. The control data further includes the direction of transmission in the telephone terminal equipment, as well as, the overall level of attenuation that has been calculated during manufacture from the attenuation levels of the individual functional units.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawing in which:

FIG. 1 is a general block diagram depicting the functional units which form a voice channel within the telephone terminal equipment and to which the method of the present invention applies.

DESCRIPTION OF THE PREFERRED EMBODIMENTS

FIG. 1 depicts a voice transmission channel 10 which comprises a transmission amplifier 12 connected to a channel input 14. In series with the transmission amplifier 12 is a reception amplifier 16, a sub-assembly element 18, and an attenuation element 20. The attenuation element 20 is also connected to an output 22 of the voice channel 10. The subassembly element 18 may be any one of a number of functional units within the telephone terminal equipment, such as a handset, a loudspeaker, etc. The attenuation element 20 is controlled by a microprocessor 24 which is connected to a non-erasable memory 26. In FIG. 1, the input level to the voice channel 10 is designated as $U_e$ and the output level is designated as $U_a$.

Telephone terminal equipment, particularly speaker phone stations, contain individual functional units, such as amplifiers, handsets, microphones, loudspeakers and other component parts, each of which has associated with it an attenuation level component. This attenuation level component fluctuates per component part within defined limits which result from manufacturing production. Typically, the specifications for the telephone terminal equipment sets a given input level, Ue, and a fixed output level, Ua, which is allowed to fluctuate only within prescribed limits. In mass production of telephone terminal equipment, it follows that the output level, Ua, of any given voice channel will fluctuate past its prescribed limits due to the series connection of the individual functional units having different attenuation level tolerances. Using the method of the present invention, the output level, Ua, can be insured to be within its prescribed limits.

In utilizing the method of the present invention, the level attenuation tolerances of all individual units within the voice channel are summed. The input level to the voice channel is then increased by half the sum of the level attenuation tolerances. This may be done, for example, by increasing the gain of the transmission amplifier 12, or may be done in a variety of other manners. This increase in the input level provides at least a predetermined minimum output level of the voice channel 10. A non-erasable electronic memory 26 is provided and control data representative of the voice channel 10 is stored in a predetermined location in the memory 26. Upon operation of the voice channel 10, the control data is retrieved from the predetermined location in the memory 26 by microprocessor 24. The adjustable attenuation element 20 is then set by the microprocessor 24 as determined by the control data. This provides a predetermined final output value in addition to the minimum output value.

The control data may comprise control values for each of the individual units as well as a control value which represents the summation of the series of functional units comprising the voice channel 10. Control data also contains a control value corresponding to the direction of transmission in the voice channel.

It is important to note that especially in speaker phone stations, these devices already provide a microprocessor as a control unit. Also, adjustable attentuation elements which are controlled by the microprocessor are already present for switching the voice direction per transmission direction, and thus per voice channel 10. As a result, implementation of the method of the present invention is effected in a speaker phone station by only the addition of a non-erasable memory location. Thus, a significant advantage results from use of the present method when applied to mass production of speaker phone stations.

The present invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

I claim:

1. A method for the control of voice channel attenuation in telephone terminal equipment having a plurality of individual units each having a predetermined level attenuation tolerance, comprising:
   computationally adding the level attenuation tolerances of all individual units in the voice channel;
   increasing an input level to the voice channel by half the calculated sum of the level attenuation tolerances;
   providing a non-erasable electronic memory for storing a control value associated with the voice channel;
   interrogating said memory by a microprocessor upon voice channel operation to obtain the control value;
   attenuating the voice channel by an amount determined by the control value with an attenuation element in the voice channel and controlled by said microprocessor;
   determining a respective transmission direction in the telephone terminal equipment from the control value; and
   controlling within a predetermined tolerance an output level of the voice channel from said attenuation of the voice channel, from said determined transmission direction and from said increased input level.

2. A method for the control of attenuation of at least one voice channel in telephone terminal equipment having a plurality of individual units each having a predetermined level of attenuation, comprising:
   increasing an input level to the voice channel by a predetermined first value determined from the levels of attenuation of substantially all of the individual units in the voice channel, thereby producing a predetermined minimum output level of the voice channel;
   providing control data for the voice channel representative of the predetermined level of attenuation of the plurality of individual units in the voice channel; and
   controlling an attenuation element in the voice channel as determined by said control data, thereby balancing the levels of attenuation of the individual units to produce a predetermined total output level for the voice channel.

3. The method described in claim 2, wherein the step of increasing an input level to the voice channel comprises:
   summing the levels of attenuation corresponding to the levels of attenuation of the individual units in the voice channel; and
   boosting the input level of the voice channel by half the calculated sum of levels of attenuation.

4. The method described in claim 2, wherein the step of providing control data comprises:
   storing control data representative of the voice channel in a predetermined location in an electronic memory; and
   retrieving said control data from said predetermined location in said memory upon operation of the voice channel.

5. The method described in claim 4, wherein the step of storing control data comprises storing control values representative of the attenuation tolerances of the individual units in the voice channel and also storing control values corresponding to the direction of transmission in the telephone terminal equipment.

6. The method described in claim 4, wherein said electronic memory is non-erasable.

7. The method described in claim 4, wherein control data is retrieved from said electronic memory by a microprocessor which also controls said attenuation element.

8. The method described in claim 2, wherein the step of controlling an attenuation element further comprises determining the direction of transmission in the telephone terminal equipment from the control data;
   and determining control values from said control data for the individual units in the voice channel.

9. A method for the control of attenuation of at least one voice channel in telephone terminal equipment having a plurality of individual units each having a predetermined level of attenuation, comprising:
   summing the level attenuation tolerances of all individual units within the voice channel;
   increasing an input level to the voice channel by half the sum of the level attenuation tolerances, thereby providing at least a predetermined minimum output level of the voice channel;
   providing a non-erasable electronic memory;
   storing control data representative of the voice channel in a predetermined location in said memory;

retrieving said control data from said predetermined location in said memory upon operation of the voice channel;

providing an adjustable attenuation element in the voice channel;

setting said adjustable attenuation element as determined by said control data to provide a predetermined final output level in additional to said minimum output level.

10. The method described in claim 9, wherein the step of setting the adjustable attenuation element further comprises determining the direction of transmission in the telephone terminal equipment.

11. The method described in claim 9 wherein the step of storing control data comprises storing control values for the individual units in the voice channel and also storing control values corresponding to the direction of transmission in the telephone terminal equipment.

12. The method described in claim 9 wherein a microprocessor retrieves said control data and sets said adjustable attenuation element.

* * * * *